United States Patent
Russell et al.

(10) Patent No.: US 7,647,621 B2
(45) Date of Patent: Jan. 12, 2010

(54) SYSTEM, METHOD AND COMPUTER PROGRAM PRODUCT FOR APPLYING ELECTRONIC POLICIES

(75) Inventors: Ryan S. Russell, Hillsboro, OR (US); David D. Levine, Portland, OR (US)

(73) Assignee: McAfee, Inc., Santa Clara, CA (US)

( * ) Notice: Subject to any disclaimer, the term of this patent is extended or adjusted under 35 U.S.C. 154(b) by 803 days.

(21) Appl. No.: 11/112,032

(22) Filed: Apr. 22, 2005

(65) Prior Publication Data

US 2006/0242684 A1 Oct. 26, 2006

(51) Int. Cl.
*G06F 15/177* (2006.01)
(52) U.S. Cl. .............................. 726/1; 709/220; 709/222
(58) Field of Classification Search .................... 726/1, 726/6, 14, 24, 26; 713/188
See application file for complete search history.

(56) References Cited

U.S. PATENT DOCUMENTS

| | | | |
|---|---|---|---|
| 6,314,409 B2 * | 11/2001 | Schneck et al. ............... 705/54 |
| 6,393,474 B1 * | 5/2002 | Eichert et al. ............... 709/223 |
| 6,499,110 B1 | 12/2002 | Moses et al. ............... 713/201 |
| 6,611,925 B1 * | 8/2003 | Spear ........................... 714/38 |
| 6,647,493 B1 * | 11/2003 | Occhipinti et al. .......... 713/170 |
| 6,826,698 B1 * | 11/2004 | Minkin et al. ................... 726/1 |
| 6,873,988 B2 * | 3/2005 | Herrmann et al. ............. 707/10 |
| 7,020,645 B2 * | 3/2006 | Bisbee et al. .................... 707/1 |
| 7,058,970 B2 * | 6/2006 | Shaw ............................ 726/6 |
| 7,225,461 B2 * | 5/2007 | Oshima et al. .................. 726/3 |
| 7,287,278 B2 * | 10/2007 | Liang ............................ 726/22 |
| 7,313,821 B1 * | 12/2007 | Steiner et al. .................. 726/23 |
| 7,350,204 B2 * | 3/2008 | Lambert et al. ............. 717/172 |
| 7,376,838 B2 * | 5/2008 | Narayanan .................. 713/183 |
| 7,386,888 B2 * | 6/2008 | Liang et al. ................... 726/23 |
| 7,392,541 B2 * | 6/2008 | Largman et al. .............. 726/17 |
| 7,395,341 B2 * | 7/2008 | Nicodemus et al. ......... 709/229 |
| 7,565,683 B1 * | 7/2009 | Huang et al. ................... 726/1 |
| 2002/0091819 A1 * | 7/2002 | Melchione et al. .......... 709/224 |
| 2002/0099952 A1 * | 7/2002 | Lambert et al. ............. 713/200 |
| 2003/0110397 A1 * | 6/2003 | Supramaniam et al. ..... 713/201 |
| 2005/0028006 A1 | 2/2005 | Leser et al. .................. 713/200 |

OTHER PUBLICATIONS

Search Report and Written Opinion from PCT Application No. PCT/US2006/08969 mailed on Sep. 20, 2007.
"ePolicy Orchestrator Version 3.5: Quick Reference Card" McAfee.com.
"McAfee IntruShield Security Management: Data Sheet" McAfee Network Protection Solutions, www.mcafee.com.
"HP open View Products: A Partner for the business of change" © 2005 Hewlett-Packard Development Company, L.P.
International Preliminary Report on Patentability from PCT Application No. PCT/US2006/008969 which was issued on Oct. 23, 2007.

* cited by examiner

*Primary Examiner*—Ponnoreay Pich
(74) *Attorney, Agent, or Firm*—Zilka-Kotab, PC (57) ABSTRACT

A system, method and computer program product are provided for policy management. In use, a plurality of rules for applying policies to a computer are identified. Further, information associated with the computer is also identified. Such rules and information are then utilized for applying the policies to the computer.

18 Claims, 6 Drawing Sheets

SYSTEM, METHOD AND COMPUTER PROGRAM PRODUCT FOR APPLYING ELECTRONIC POLICIES

FIELD OF THE INVENTION

The present invention relates to policy management, and more particularly to applying electronic policies.

BACKGROUND

Information technology (IT) environments have generally moved from being primarily static to extremely dynamic, such that they require constant management for the continuously changing needs of the environment. Changes in the IT environment may include security changes, updates, modifications to user privileges, etc. To help in the management of these dynamic IT environments, electronic policies have been utilized with regard to computers on a network.

Unfortunately, managing electronic policies can be cumbersome, especially when the policies are associated with exceptionally large corporations operating up to hundreds of thousands of computers. To solve this problem, policy management systems have been employed to ease the management of electronic policies.

An example of a policy management system that has previously been employed is one that is based on a hierarchical tree structure. In these systems, an associated graphical user interface is comprised of a control panel illustrating the policies in the form of a tree, where a policy set is situated at a top of the tree. In use, the policy set is inherited downwards through the tree, and applied to corresponding networked computers.

In addition, inheritance of a policy by a computer can be broken for a given branch or even just a single computer, and a different policy can be assigned. One disadvantage of this system is that computers can only exist at a single position within the tree and can therefore receive only one set of policies.

Another example of a policy management system that has previously been employed is one that manages policies by utilizing groups. In such types of systems, each group contains a set of policies. Further, each computer can be assigned to one or more of the groups, and thus one or more of the policy sets. If a computer is assigned to more than one group, the system compares overlapping policies (i.e. policies that are exclusive of one another) and assigns the policy that is more secure.

The group policy management system solves the aforementioned problem of the hierarchical policy management systems by allowing computers to receive more than one policy. However, group policy management systems are still quite cumbersome, since each computer must be assigned individually to a group.

Current policy management systems are very complicated with respect to creating, maintaining, and applying policies. They require computers to be grouped or organized in some fashion in order for policies to be applied to the computers. These systems also require that both the administrator and the policy system create, update and manage the organizational structures, in addition to the policies. This makes it difficult and time-consuming for an administrator to manage the policies for numerous computers.

There is thus a need for overcoming these and/or other problems associated with the prior art.

SUMMARY

A system, method and computer program product are provided for policy management. In use, a plurality of rules for applying policies to a computer are identified. Further, information associated with the computer is also identified. Such rules and information are then utilized for applying the policies to the computer.

In one embodiment, the policies may be applied to the computer upon the computer being first included in a population of computers. Such policies may also be manually edited. The policies may again be applied to the computer after the computer is first included in the population of computers.

In another embodiment, the policies may yet again be applied to the computer in response to the identification of a problem associated with the computer. The policies may even yet again be applied to the computer in response to a change in the rules. Further, the policies may still yet again be applied to the computer in response to a virus outbreak.

In yet another embodiment, the rules may include a rule tree. In addition, the rule tree may include a plurality of decision points. Optionally, the decision points may determine a geography associated with the computer. The decision points may also determine an operating system associated with the computer. Further, the decision points may determine a type of the computer. Still yet, the decision points may determine a business unit associated with the computer.

In still yet another embodiment, the rules may be changed. The rules may be changed in response to a virus outbreak. Also, the policies may include security policies. The policies may also include administrator rights policies. Still yet, the policies may include computer setting policies. Even still yet, the policies may include notification policies. Furthermore, the policies may include task policies.

DETAILED DESCRIPTION

Figure 1:
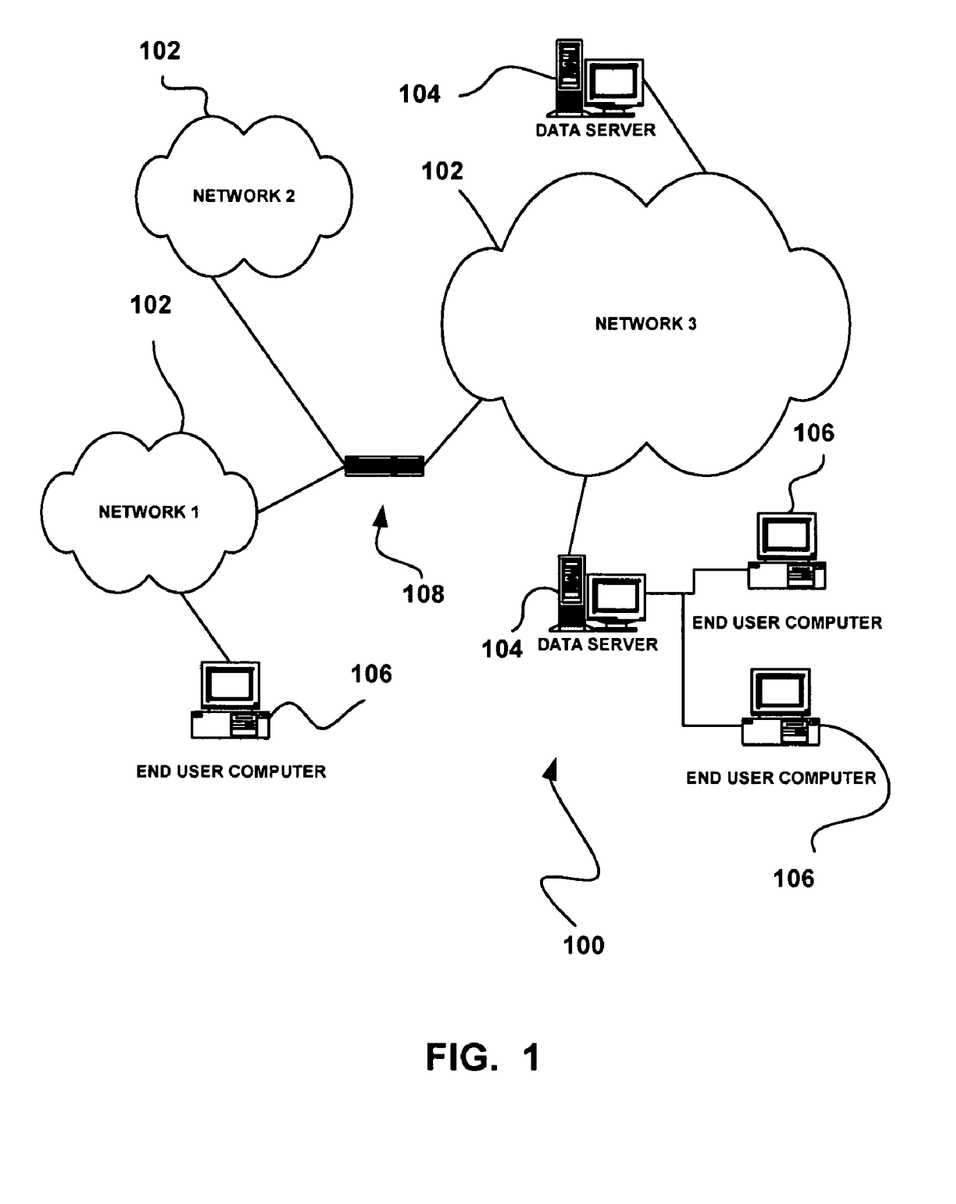
FIG. 1 illustrates a network architecture, in accordance with one embodiment.

FIG. 1 illustrates a network architecture 100, in accordance with one embodiment. As shown, a plurality of networks 102 is provided. In the context of the present network architecture 100, the networks 102 may each take any form including, but not limited to a local area network (LAN), a wide area network (WAN) such as the Internet, etc.

Coupled to the networks 102 are data server computers 104 which are capable of communicating over the networks 102. Also coupled to the networks 102 and the data server computers 104 is a plurality of end user computers 106. In order to facilitate communication among the networks 102, at least one gateway or router 108 is optionally coupled therebetween.

It should be noted that each of the foregoing network devices in the present network architecture 100, as well as any other unillustrated hardware and/or software, may be equipped with various security features. For example, the various data server computers 104 and/or end user computers 106 may be equipped with policy management hardware and/or software for purposes that will be set forth hereinafter in greater detail. More information regarding optional functionality and architectural features will now be set forth for illustrative purposes.

Figure 2:
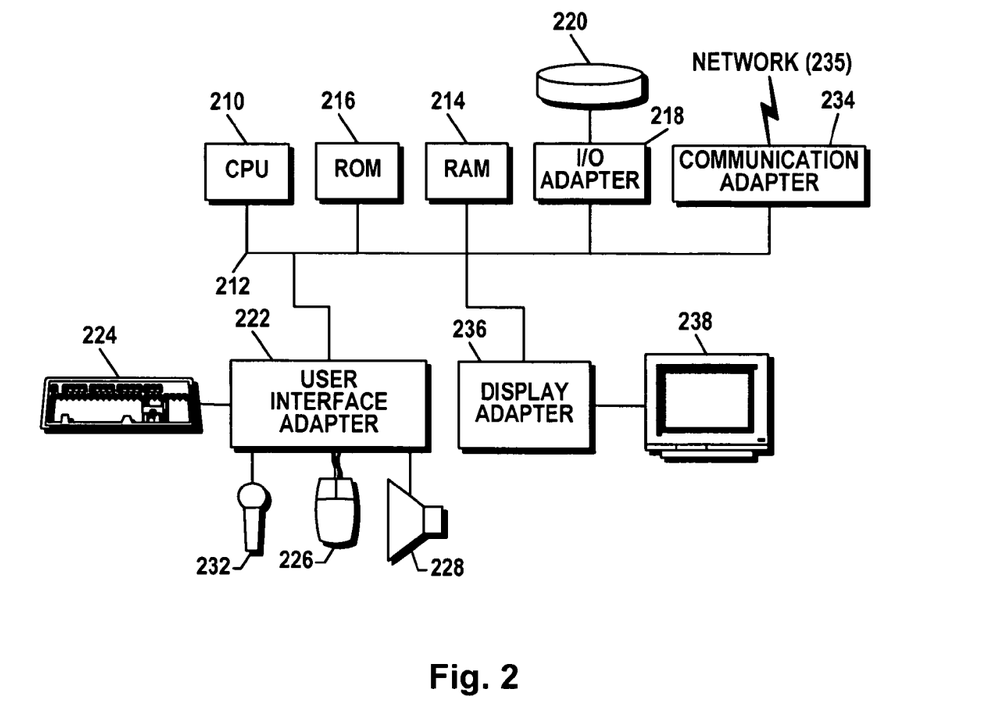
FIG. 2 shows a representative hardware environment that may be associated with the data server computers and/or end user computers of FIG. 1, in accordance with one embodiment.

FIG. 2 shows a representative hardware environment that may be associated with the data server computers 104 and/or end user computers 106 of FIG. 1, in accordance with one embodiment. Such figure illustrates a typical hardware configuration of a workstation in accordance with one embodiment having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown) to the bus 212, communication adapter 234 for connecting the workstation to a communication network 235 (e.g., a data processing network) and a display adapter 236 for connecting the bus 212 to a display device 238.

The workstation may have resident thereon any desired operating system. It will be appreciated that an embodiment may also be implemented on platforms and operating systems other than those mentioned. One embodiment may be written using JAVA, C, and/or C++ language, or other programming languages, along with an object oriented programming methodology. Object oriented programming (OOP) has become increasingly used to develop complex applications.

Our course, the various embodiments set forth herein may be implemented utilizing hardware, software, or any desired combination thereof. For that matter, any type of logic may be utilized which is capable of implementing the various functionality set forth herein.

Figure 3:
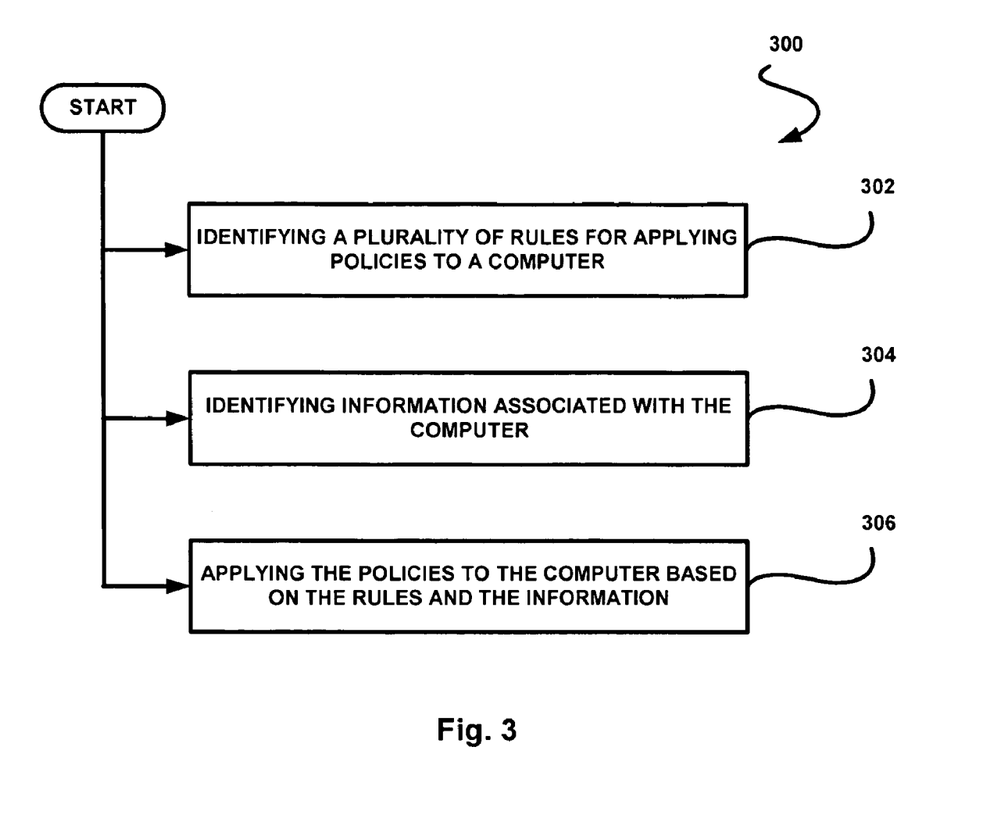
FIG. 3 illustrates a method for policy management, in accordance with one embodiment.

FIG. 3 illustrates a method 300 for policy management, in accordance with one embodiment. As an option, the present method 300 may be implemented in the context of the architecture and environment of FIGS. 1 and/or 2. Of course, however, the method 300 may be carried out in any desired environment.

As shown, the method 300 identifies a plurality of rules for applying policies to a computer, as shown in operation 302. A "policy," in the context of the present description, includes data and/or code that controls at least one aspect of a computer (see, for example, the data server computers 104 and/or end user computers 106 of FIG. 1, etc.). Further, in the context of the present description, the rules may include any data and/or code that controls the manner in which the policies are applied to the computer.

Just by way of a non-limiting example, the policy may include policies for managing aspects such as security, administrator rights, computer settings, notifications, updates, user privileges, etc. For instance, in the context of security policies, such policy or policies may enable/disable a first set of features in a virus scanner of the computer, enable/disable a second set of features in a firewall of the computer, enable/disable a third set of features in a spyware scanner of the computer, and so on.

Next, in operation 304, information associated with the computer is identified. Just by way of example, such information may include a geography associated with the computer, an operating system associated with the computer, a type of the computer, a business unit associated with the computer and any other information associated with the computer capable of being identified for policy management purposes.

Upon the identification of the rules, and information associated with the computer, the policies are applied to the computer based on the rules and the information, as shown in operation 306. For example, the policies may be applied to the computer utilizing the information in a manner that is dictated by the rules.

More illustrative information will now be set forth regarding various optional architectures and features with which the foregoing method 300 may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
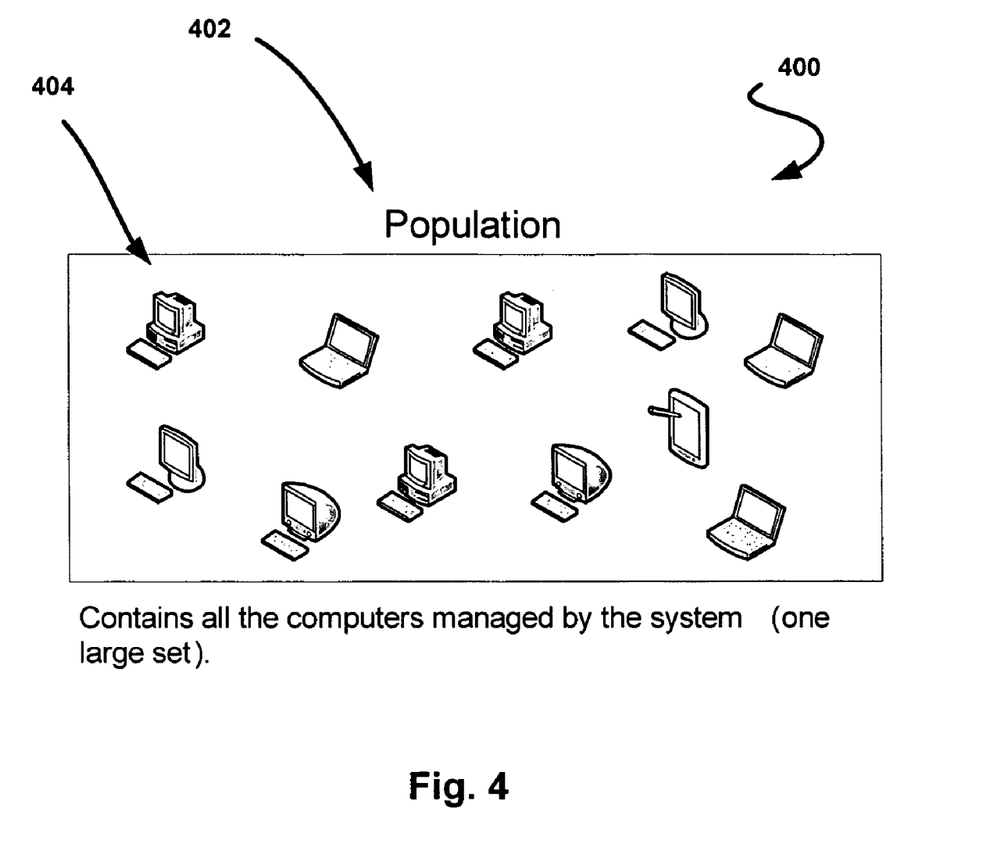
FIG. 4 illustrates a population of computers, in accordance with one embodiment.

FIG. 4 illustrates a population 400 of computers, in accordance with one embodiment. As an option, the present population 400 may be implemented in the context of the architecture and environment of FIGS. 1-3. Of course, however, the population 400 may exist in any desired environment. In the context of the present description, the population 400 may include any type of computer 404, such as a desktop computer, a laptop computer, a handheld computer, cell phone, and/or any other type computer capable of being assigned policies.

As shown, the population 400 includes a plurality of computers 404 in a networking environment. Of course, the population 400 may include any grouping of computers 404. Specifically, in one embodiment, computers 404 to which policies are to be applied may all belong to a single population 402. Thus, the computers 404 are not necessarily organized, grouped and/or categorized in any manner, such as in a hierarchical structure or otherwise, and the policies are not necessarily applied according to such structures. Of course, in some embodiments, such techniques may still be used, in combination with the embodiments disclosed herein.

As shown, each computer 404 may be at the same "level" as every other computer 404 in the population 402 and is therefore capable of being assigned any policies. One exemplary, non-limiting technique for assigning policies will be described in further detail during reference to FIG. 5.

Figure 5:
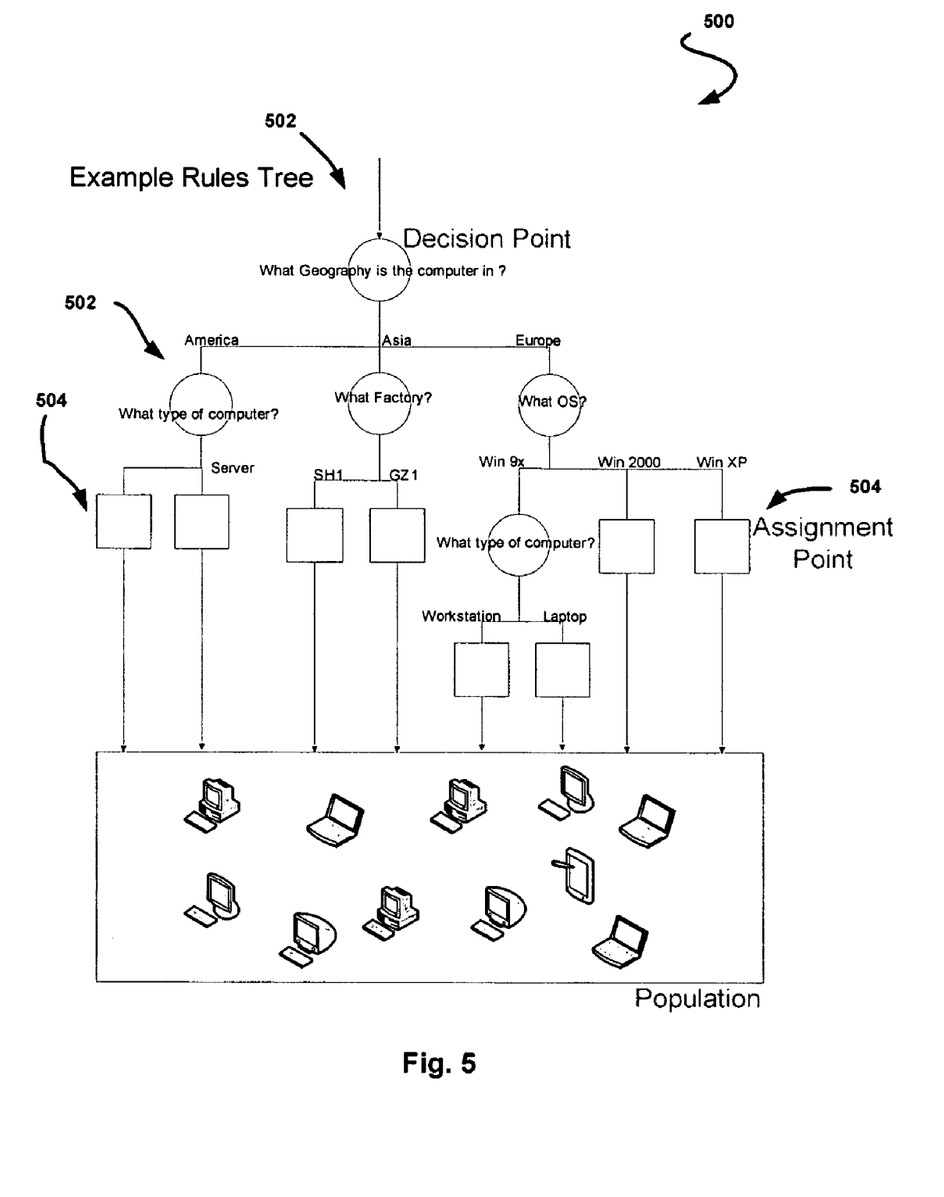
FIG. 5 illustrates a rule tree, in accordance with one embodiment.

FIG. 5 illustrates a rule tree 500, in accordance with yet another embodiment. As an option, the rule tree 500 may be implemented in the context of the architecture and environment of FIGS. 1-4. Of course, however, the rule tree 500 may be used in any desired environment. Also, it should be noted that the rule tree 500 is only one example of a rule tree 500 that may be utilized for policy management.

As shown, the rules utilized for applying policies to the computer may take the form of a rule tree 500 with a plurality of decision points 502 which apply the policies to each computer based on the information, at assignment points 504 (per operation 306 of FIG. 3, for example). The decision points 502 may determine a geography associated with the computer, an operating system associated with the computer, a type of the computer, a business unit associated with the computer and/or any other factors that may be relevant to applying policies to the computer.

In use, the rule tree 500 is traversed by making decisions at the decision points 502 according to information associated with the computer. The computer then follows specific branches of the rule tree 500 based on the decisions made at the decision points 502. Decisions at decision points 502 are continuously made until one of the assignment points 504 is reached.

Once the computer reaches one of the assignment points 504, a single set of policies are assigned to the computer according to the specific assignment point 504, and the computer may then be released to the general population of computers. A single set of policies associated with each assignment point 504 can include any number of policies, and the policies may include any number of types of policies relevant to security, administrator rights, computer settings, notifications and/or tasks, for example.

An exemplary policy set associated with the assignment points 504 illustrated in FIG. 5, is set forth in Table 1. It should be strongly noted that the contents of Table 1 are set forth for illustrative purposes only, and should not be construed as limiting in any manner whatsoever.

TABLE 1

| POLICY SET | GEOGRAPHY | COMPUTER TYPE/ FACTORY/OS | COMPUTER TYPE |
|---|---|---|---|
| AdministratorPolicy1 SecurityPolicy1 SettingPolicy1 | America | Type = Client | n/a |
| AdministratorPolicy2 SecurityPolicy2 SettingPolicy2 | America | Type = Server | n/a |
| AdministratorPolicy3 SecurityPolicy3 SettingPolicy3 | Asia | Factory = SH1 | n/a |
| AdministratorPolicy4 SecurityPolicy4 SettingPolicy4 | Asia | Factory = GZ1 | n/a |
| AdministratorPolicy5 SecurityPolicy5 SettingPolicy5 | Europe | OS = Win9x | Workstation |
| AdministratorPolicy6 SecurityPolicy6 SettingPolicy6 | Europe | OS = Win9x | Laptop |
| AdministratorPolicy7 SecurityPolicy7 SettingPolicy7 | Europe | OS = Win2000 | n/a |
| AdministratorPolicy8 SecurityPolicy8 SettingPolicy8 | Europe | OS = WinXP | n/a |

It should be noted that the foregoing policies don't necessarily have to be different at each assignment point. For example, the first assignment point could have AdminPolicy1, SecurityPolicy1, and SettingPolicy1, while the second assignment point might have AdminPolicy2, SecurityPolicy1, and SettingPolicy2. Policies can be mixed and matched at each assignment point. The policies at each assignment point don't have to be different.

Utilization of the decision points 502 allows a computer to be led to a particular assignment point 504 such that specific policies can be applied to each computer according to the information associated with the computer. The decision points 502 may each have at least two branches and up to as many branches as necessary to provide for every possible decision. Such branches may each further include either another decision point 502 or one of the assignment points 504.

Furthermore, the decision points 502 may be organized by priority, such that the decision points 502 with a higher priority may be decided before the decision points 502 with a lower priority. Therefore, in the rule tree 500, high priority decision points 502 are placed at the top of the rule tree 500 above lower priority decision points 502. Just by way of example, in FIG. 5, the geography of each computer is of a higher priority than a type, factory, or operating system of each computer.

Since the rule tree 500, as described in FIG. 5, allows for a single set of policies to be applied to each computer, any overlap of conflicting policies may be avoided, such that decisions do not necessarily have to be made as to which policy to apply. For instance, prior art methods of policy management, such as group policy management, allow for computers to be associated with multiple groups and thus multiple policies of the same type, such as multiple security policies. Thus, in group policy management systems, decisions may have to be made about which policy of the certain policy type to apply.

In addition, the present rule tree policy management technique does not necessarily (but may) involve inheritance, as with the hierarchical policy management systems. Therefore, a computer is not necessarily limited to a policy employed by the computer directly above it in the networking hierarchy.

In one embodiment, one rule tree 500 is capable of being active at a time, but there may be multiple other non-active rule trees 500. Simply utilizing the regular, day-to-day rule tree 500 may be inadequate in certain circumstances. Thus, the presence of multiple rule trees 500 allows an administrator to switch between different rule trees 500, based on certain circumstances and/or conditions. Once a new rule tree 500 has been activated, an administrator may rerun the computers throughout the rule tree 500 to accordingly apply the new policies.

This feature is particularly advantageous, for example, when there is a virus outbreak since it allows an administrator to utilize a rule tree 500 specifically designed to secure all computers in the population. One exemplary virus outbreak rule tree 500 will be set forth during the description of FIG. 6.

In another embodiment, the rule tree 500 can be modified. For example, the decision points 502 may be added, deleted and/or modified. In addition, the assignment points 504 may be also added, deleted and/or modified. Such modifications may be made by an administrator and/or a management system. This provides a flexible policy management system wherein changes are easy to implement.

In yet another embodiment, user permissions may be utilized for specifying the decision points 502 and assignment points 504 which administrators can access and/or modify. Of course any permission type can be utilized (e.g. time, computer, type, etc.) in limiting access and/or modification rights to such decision points 502 and assignment points 504. Thus, the present embodiment is capable of having a layer of protection such that rule trees 500 cannot be accessed and/or modified without permission.

As an option, computers may be run through a specific rule tree 500 in at least three instances. The first situation occurs when a computer attempts to join the general population of computers for the first time. In this instance, the computer may first pass through the rule tree 500, thus receiving a policy set, before it is placed into the population of computers.

The second situation occurs when an administrator and/or management system decides to rerun a computer through the rule tree 500. This may be the case when, for instance, there is a problem with the computer, the rule tree 500 is modified, there is a virus outbreak, and/or any other circumstance necessitating a new and/or modified policy set.

The third situation may occur when an administrator manually changes a computer policy and/or rule. In this instance, the computer may be rerun through the rule tree 500. This may be allowed at any time an administrator selects a computer and/or a plurality of computers, and manually applies policy modifications. Of course, it should be noted that computers may be run through the rule tree 500 at any other time, as deemed necessary.

Figure 6:
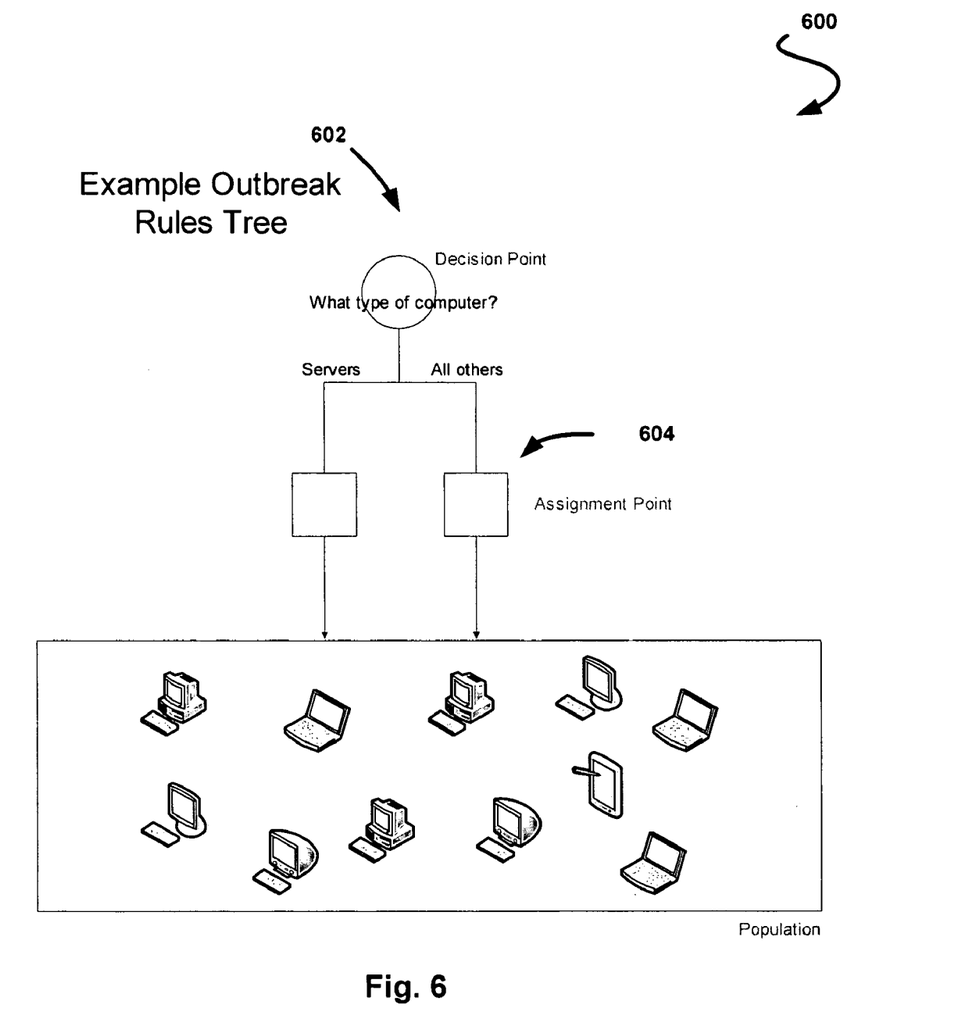
FIG. 6 illustrates a rule tree for utilization after a virus outbreak, in accordance with another embodiment.

FIG. 6 illustrates a rule tree 600 for utilization after a virus outbreak, in accordance with still yet another embodiment. As an option, the rule tree 600 for utilization after a virus outbreak may be implemented in the context of the architecture and environment of FIGS. 1-5. Of course, however, the rule tree 600 for utilization after a virus outbreak may be used in any desired environment. Also, it should be noted that the rule tree 600 for utilization after a virus outbreak is only one example of a rule tree 600 that may be utilized for policy management.

Initially, at a decision point 602, a type of each computer is determined. If the computer is a server, the computer continues to an assignment point 604 associated with a server branch of the rule tree 600. At the assignment point 604, a policy associated with the assignment point 604 is applied to the computer and the computer is then released to the general population of computers.

If it determined at decision point 602 that the computer is any other type of computer, the computer continues to the assignment point 604 associated with the "all others" branch of the rule tree 600. At the assignment point 604, a policy associated with the assignment point 604 is applied to the computer and the computer is then released to the general population of computers.

An exemplary policy set associated with the assignment points 604 illustrated in FIG. 6, is set forth in Table 2. It should be strongly noted that the contents of Table 2 are set forth for illustrative purposes only, and should not be construed as limiting in any manner whatsoever.

TABLE 2

| POLICY SET | COMPUTER TYPE |
|---|---|
| AdministratorPolicy1 | Server |
| SecurityPolicy1 | |
| SettingPolicy1 | |
| AdministratorPolicy2 | All Others |
| SecurityPolicy2 | |
| SettingPolicy2 | |

Of course any type and number of decision points 602 may be utilized in determining a policy set to assign to each computer. For instance, a decision as to the geography, operating system, and/or business unit may be utilized in determining a specific policy to assign to a computer.

As an option, the aforementioned features may be used in the context of security software (e.g. a virus scanner, a firewall, a spyware scanner, an intrusion detection system, etc.) Thus, in one embodiment, terrorism may be countered utilizing the aforementioned technology. According to the U.S. Federal Bureau of Investigation, cyber-terrorism is any "premeditated, politically motivated attack against information, computer systems, computer programs, and data which results in violence against non-combatant targets by sub-national groups or clandestine agents." A cyber-terrorist attack is designed to cause physical violence or extreme financial harm. According to the U.S. Commission of Critical Infrastructure Protection, possible cyber-terrorist targets include the banking industry, military installations, power plants, air traffic control centers, and water systems. Thus, by optionally incorporating the present technology into the cyber-frameworks of the foregoing potential targets, terrorism may be countered by preventing the infection thereof with malware, which may potentially cause extreme financial harm.

While various embodiments have been described above, it should be understood that they have been presented by way of example only, and not limitation. For example, any of the network elements may employ any of the desired functionality set forth hereinabove. Thus, the breadth and scope of a preferred embodiment should not be limited by any of the above-described exemplary embodiments, but should be defined only in accordance with the following claims and their equivalents.

What is claimed is:

1. A method, comprising:
   identifying a plurality to rules for applying policies to a computer;
   identifying information associated with the computer that is usable for policy management; and
   applying the policies to the computer based on the plurality of rules and the information;
   wherein the plurality of rules include a rule tree;
   wherein the policies are applied to computer upon the computer being first included in a population of computers;
   wherein the rule tree include a plurality of decision points; and
   wherein the plurality of decision points determine an operation system associated with the computer.

2. The method as recited in claim 1, wherein the policies are manually edited.

3. The method as recited in claim 1, wherein the policies are again applied to the computer after the computer being first included in the population of computers.

4. The method as recited in claim 3, wherein the policies are again applied to the computer in response to the identification of a problem associated with the computer.

5. The method as recited in claim 3, wherein the policies are again applied to the computer in response to a change in the plurality of rules.

6. The method as recited in claim 3, wherein the policies are again applied to the computer in response to a virus outbreak.

7. The method as recited in claim 1, wherein the plurality of decision points determine a geography associated with the computer.

8. The method as recited in claim 1, wherein the plurality of decision points determine a type of the computer.

9. The method as recited in claim 1, wherein the plurality of decision points determine a business unit associated with the computer.

10. The method as recited in claim 1, and further comprising changing the plurality of rules.

11. The method as recited in claim 10, wherein the plurality of rules are changed in response to a virus outbreak.

12. The method as recited in claim 1, wherein the policies include security policies.

13. The method as recited in claim 1, wherein the policies include administrator rights policies.

14. The method as recited in claim 1, wherein the policies include computer setting policies.

15. The method as recited in claim 1, wherein the policies include notification policies.

16. The method as recited in claim 1, wherein the policies include task policies.

17. A computer readable medium encoded with a computer program, comprising:
   computer code for identifying a plurality to rules for applying policies to a computer;
   computer code for identifying information associated with the computer that is usable for policy management; and
   computer code for applying the policies to the computer based on the plurality of rules and the information;
   wherein the plurality of rules include a rule tree;
   wherein the policies are applied to computer upon the computer being first included in a population of computers;
   wherein the rule tree include a plurality of decision points; and
   wherein the plurality of decision points determine an operation system associated with the computer.

18. A system, comprising:
   a bus;
   a display device;
   a memory; and
   a processor coupled to the memory and the display device via the bus, the processor adapted for identifying a plurality to rules for applying policies to a computer and information associated with the computer that is usable for policy management;
   wherein the policies are applied to the computer based on the plurality of rules and the information;
   wherein the plurality of rules include a rule tree;
   wherein the system is operable such that the policies are applied to computer upon the computer being first included in a population of computers;
   wherein the rule tree include a plurality of decision points; and
   wherein the system is operable such that the plurality of decision points determine an operation system associated with the computer.

* * * * *

UNITED STATES PATENT AND TRADEMARK OFFICE
CERTIFICATE OF CORRECTION

PATENT NO.        : 7,647,621 B2           Page 1 of 1
APPLICATION NO. : 11/112032
DATED             : January 12, 2010
INVENTOR(S)       : Russell et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1167 days.

Signed and Sealed this

Twenty-eighth Day of December, 2010

David J. Kappos
*Director of the United States Patent and Trademark Office*